Patented Dec. 17, 1935

2,024,749

UNITED STATES PATENT OFFICE 2,024,749

PREPARATION OF HALOGENATED ETHERS

Norman D. Scott, Niagara Falls, N. Y., assignor to
E. I. du Pont de Nemours & Company, Inc.,
Wilmington, Del., a corporation of Delaware No Drawing. Application August 4, 1932,
Serial No. 627,539

19 Claims. (Cl. 260—151)

This invention relates to a process of reacting halogenated ethers with olefine hydrocarbons to produce halogenated ethers of higher molecular weight.

I have found that chlormethyl ether and other alpha halogenated ethers can be made to react with olefine hydrocarbons giving as a main product a gamma chlor ether formed by the addition of the halogen atom and the ether residue to the unsaturated linkage of the olefine hydrocarbon. Thus, from ethylene and chlormethyl ether I have obtained gamma chlorpropyl methyl ether as represented by the following equation:

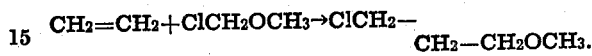

Similarly, from propylene and chlormethyl ether I have obtained gamma chlorbutyl methyl ether;

In this case it will be noted that the chlorine atom adds on to the middle carbon atom of the propylene, in the "secondary" position, as might, perhaps, be predicted by analogy with the known manner of addition of hydrohalogens to propylene.

The addition of the methoxy methylene group to the other side of the olefine linkage results as shown above, in the formation of a normal butane derivative. This was shown experimentally by treating the chlorbutyl methyl ether with strong NaOH to split out HCl, resulting in the formation of $CH_3—CH=CH—CH_2OCH_3$ which was then converted by catalytic hydrogenation with a platinum oxide catalyst, into normal butyl methyl ether.

I have carried out analogous reactions using amylene as the olefine hydrocarbon. This reacts even more vigorously than propylene which in turn reacts more vigorously than ethylene. In addition to condensations involving monochlormethyl ether, I have carried out the similar condensation reactions using the following alpha-halogenated ethers: symmetric dichlordimethyl ether, monobrommethyl ether, alpha chlorethyl ether, and monochlormethyl isopropyl ether.

The best conditions and methods for carrying out the reactions will of course vary with the particular olefine hydrocarbon and alpha halogenated ether. In general the use of a catalyst has been found advisable though not necessary in some cases. I have found that moderately easily hydrolizable metal halides, soluble in the halogenated ether-olefine reaction mixture, such as, $BiCl_3$, $BiBr_3$, $SbCl_5$, $SnCl_4$, $ZnCl_2$, $FeCl_3$, $AlCl_3$, form satisfactory catalysts. The optimum combination of temperature, pressure, catalyst concentration, and duration of reaction will obviously vary with particular combination of materials employed. The following examples are given by way of further illustration of methods of carrying out these reactions:

Example 1

1000 cc. of monochlormethyl ether containing in solution 50 gms. of $BiCl_3$ was placed in a steel bomb, mounted on a shaker and connected to a cylinder of propylene. Propylene was readily absorbed as admitted and the mixture warmed up due to the heat of reaction. By a combination of external cooling, and controlled rate of admitting the propylene, the temperature was kept from exceeding 70° C. and averaged about 50° C. during the period of saturation which was one and one-half hours. The final pressure in the bomb was 150 lbs. The bomb was cooled in ice water, the excess propylene vented, and the liquid poured out. This crude product measured 1490 cc. and weighed 1676 gms. After washing with water, drying and distilling, a fraction was collected at 121–131° C. weighing 938 gms. which was very largely chlorbutyl methyl ether. A total of 353 cc. of higher boiling material was largely a chlorheptyl methyl ether, boiling point about 205° C. The molecular weight and composition of this substance indicate that it is derived from the reaction of two molecules of propylene with one molecule of chlormethyl ether. It most probable formula appears to be

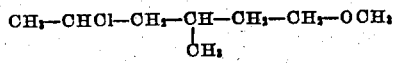

Analogous high boiling by-products were also obtained from ethylene and chlormethyl ether. Accordingly the compound would be a chloramyl methyl ether.

The reaction has been studied with alpha halogenated ethers as the original raw material. The formation of epsilon chlor ethers along with gamma chlor ethers, is believed to represent a successive condensation of a second molecule of olefine with the gamma chlor ether.

Example 2

A solution of 10 gms. $ZnCl_2$ in 200 cc. chlormethyl ether was treated with 10 cc. portions of amylene until a total of 250 cc. had been added during a period of about 1 hour. The flask was shaken after each addition and the temperature was kept below 30° C. by occasionally immersing in ice water. When the reaction had ceased the mixture was thoroughly washed with water at 50° C. 250 cc. of oily material was obtained. The material was distilled, yielding 200 cc. of an oil which boiled, with some decomposition, at about 150° C. Rapid redistillation under reduced pressure at 80° C. gave a relatively pure product which was identified as monochlorhexyl methyl ether.

Example 3

200 cc. of chlor methyl ether and 150 cc. of amylene were mixed together and allowed to stand over night at room temperature. After washing with hot water 50 cc. of an oil remained. This oil was dried with $CaCl_2$ and distilled, the main fraction of about 30 cc. distilling at 150° C. with some decomposition. Rapid redistillation under vacuum at 80° C. gave 20 cc. of relatively pure product which was identified as chlorhexyl methyl ether.

Example 4

500 cc. of chlormethyl ether, containing 25 gms. of $BiCl_3$ in solution was placed in a steel bomb mounted on a shaker, and connected to a cylinder of compressed ethylene. The reaction mixture was heated to 80° C. and treated with ethylene at 700–800 lbs. pressure for 7 hours. The excess gas was vented after cooling the bomb, and the liquid products poured out. On fractionation 191 grams of a material boiling at 109–115° C. was obtained; this was very largely gamma chlor propyl methyl ether.

Example 5

A solution of 5 gms. $ZnCl_2$ in 100 cc. of somewhat impure dichlordimethyl ether was shaken with propylene at atmospheric pressure, at about room temperature, until there was no further absorption of gas.

The crude product containing dichlor-dibutyl ether was then washed with water and diluted NaOH until substantially neutral. After drying with $CaCl_2$ this was distilled under vacuum. 23 cc. were collected boiling mainly at 130–135° C., at 10 mm. Hg. pressure. Determination of chlorine in this material showed it to contain 32.5%, as compared with 35.6% in pure dichlordibutyl ether.

The term "alpha halogenated ether" as used in the specification and claims refers to halogens on a carbon atom next to the ether oxygen atom.

I claim:

1. Method for the production of halogenated aliphatic higher ethers which comprises reacting an alpha halogenated aliphatic ether with an organic compound containing an olefinic linkage between two carbon atoms.

2. Method for the production of halogenated aliphatic higher ethers which comprises reacting an alpha halogenated aliphatic ether with an olefine hydrocarbon.

3. Method for the production of chlorinated aliphatic higher ethers which comprises reacting an alpha chlorinated aliphatic ether with an organic compound containing an olefinic linkage between two carbon atoms.

4. Method for the production of chlorinated aliphatic higher ethers which comprises reacting an alpha chlorinated aliphatic ether with an olefine hydrocarbon.

5. Process which comprises reacting an alpha halogenated aliphatic ether with an organic compound having an olefine hydrocarbon group.

6. Process which comprises reacting an alpha halogenated ether with an olefine hydrocarbon.

7. Process which comprises reacting an alpha chlorinated ether with an olefine hydrocarbon.

8. Process which comprises reacting monochlormethyl methyl ether with an organic compound containing an olefinic linkage between two carbon atoms.

9. Process which comprises reacting symmetric dichlordimethyl ether with an organic compound containing an olefinic linkage between two carbon atoms.

10. Process which comprises reacting monochlormethyl methyl ether with an olefine hydrocarbon.

11. Process which comprises reacting symmetric dichlordimethyl ether with an olefine hydrocarbon.

12. Method for the production of halogenated aliphatic higher ethers which comprises reacting an alpha halogenated aliphatic ether with an organic compound containing an olefinic linkage between two carbon atoms in the presence of a moderately easily hydrolizable metal halide soluble in the reaction mixture.

13. Method for the production of halogenated aliphatic higher ethers which comprises reacting an alpha halogenated aliphatic ether with an olefine hydrocarbon in the presence of a moderately easily hydrolizable metal halide soluble in the reaction mixture.

14. Method for the production of halogenated aliphatic higher ethers which comprises reacting an alpha halogenated aliphatic ether with an organic compound containing an olefinic linkage between two carbon atoms in the presence of a bismuth halide.

15. Method for the production of halogenated aliphatic higher ethers which comprises reacting an alpha halogenated aliphatic ether with an olefine hydrocarbon in the presence of a bismuth halide.

16. Method for the production of halogenated aliphatic higher ethers which comprises reacting an alpha halogenated aliphatic ether with an olefine hydrocarbon in the presence of bismuth chloride.

17. Method for the production of halogenated aliphatic higher ethers which comprises reacting an alpha halogenated aliphatic ether with an olefine hydrocarbon in the presence of zinc chloride.

18. Method for the production of halogenated aliphatic higher ethers which comprises reacting an alpha halogenated aliphatic ether with an olefine hydrocarbon in the presence of tin chloride.

19. As a new product, gamma chlor primary butyl methyl ether.

NORMAN D. SCOTT.